(12) United States Patent
West et al.

(10) Patent No.: US 12,265,174 B2
(45) Date of Patent: Apr. 1, 2025

(54) AESA TX PULSE PAIR RADIATION PATTERN PHASE CONJUGATION FOR LOW SIDE LOBE/MAXIMUM EIRP RADIATION PATTERN

(71) Applicant: Rockwell Collins, Inc., Cedar Rapids, IA (US)

(72) Inventors: James B. West, Cedar Rapids, IA (US); Venkata A. Sishtla, Cedar Rapids, IA (US); Jiwon L Moran, Marion, IA (US); Jacob G. Teague, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 720 days.

(21) Appl. No.: 17/517,244

(22) Filed: Nov. 2, 2021

(65) Prior Publication Data
US 2024/0319330 A1    Sep. 26, 2024

(51) Int. Cl.
*G01S 7/28* (2006.01)
*G01S 7/282* (2006.01)
*G01S 13/02* (2006.01)
*G01S 13/95* (2006.01)

(52) U.S. Cl.
CPC .......... *G01S 7/2813* (2013.01); *G01S 7/282* (2013.01); *G01S 2013/0254* (2013.01); *G01S 13/95* (2013.01)

(58) Field of Classification Search
None
See application file for complete search history.

(56) References Cited

U.S. PATENT DOCUMENTS

| | | | |
|---|---|---|---|
| 3,781,889 A * | 12/1973 | Mitchell | G01S 7/2813 342/94 |
| 5,151,702 A | 9/1992 | Urkowitz | |
| 5,376,939 A | 12/1994 | Urkowitz | |
| 5,440,311 A | 8/1995 | Gallagher et al. | |
| 6,392,588 B1 * | 5/2002 | Levanon | G01S 13/288 342/202 |
| 9,019,145 B1 | 4/2015 | Sishtla et al. | |
| 9,568,602 B1 | 2/2017 | Stadelmann et al. | |
| 9,689,967 B1 * | 6/2017 | Stark | G01S 7/0233 |
| 10,564,256 B2 | 2/2020 | West et al. | |
| 2004/0257265 A1 * | 12/2004 | Gottwald | H01Q 21/065 342/368 |

(Continued)

FOREIGN PATENT DOCUMENTS

| | | |
|---|---|---|
| CA | 1341213 C | 4/2001 |
| EP | 1927157 B1 | 6/2011 |
| EP | 3847719 A1 | 7/2021 |

*Primary Examiner* — Bernarr E Gregory
(74) *Attorney, Agent, or Firm* — Suiter Swantz IP

(57) ABSTRACT

A radar system including an AESA illuminates a target with a first pulse for a desired beam pointing angle (azimuth and elevation). The AESA then illuminates the target with a second pulse for the desired pointing angle, the second pulse defining a radiation pattern with a main beam in phase with the first pulse, but side lobes that are out of phase. The radar system receives return signals and combines the return signals to null the side lobes by the principle of superposition. The radar processing unit is time synced such that the pulse-pair is interpreted as a single ultra-low level side lobe return radiation pattern.

12 Claims, 4 Drawing Sheets

(56) References Cited

U.S. PATENT DOCUMENTS

2006/0055599 A1\* 3/2006 McIntire ............ H01Q 21/0025
342/368
2017/0160380 A1\* 6/2017 Searcy .................. G01S 7/2921

\* cited by examiner

AESA TX PULSE PAIR RADIATION PATTERN PHASE CONJUGATION FOR LOW SIDE LOBE/MAXIMUM EIRP RADIATION PATTERN

BACKGROUND

Low Pulse Repetition Frequency (Low PRF) weather radar system are designed to meet strict price and functionality targets. Existing radar systems utilize simple algorithmic and hardware embodiments of Ground Clutter Suppression (GCS) to optimize minimum recurring cost. Sophisticated GCS techniques, such as Space Time Adaptive Processing (STAAP) are routinely used within the military community, but are too computationally intensive and require too sophisticated hardware for the commercial weather radar market space.

Robust, high probability of detection GCS with commensurate low false alarm rate is needed since the antenna beam is required to down look into the air strip runway/earth's surface during aircraft runway approach. Similar issues arise when detecting airborne targets such as aircraft. Ground clutter can complicate airborne target detection through sidelobes that can spoof the radar system causing false target detection, and erroneous target position if the aircraft is detected through high sidelobes.

Traditional "single-pulse" active electronically scanned array (AESA) far field pattern synthesis techniques require element level amplitude tapering which severely degrades AESA Effective Isotropic Radiated Power (EIRP); effective aggregate power amplitude RF output is severely attenuated, and transmit amplitude tapering reduces power which in term reduces radar slant range.

Existing GCS techniques are not well suited for an AESA because the far field radiation patterns change with the predictive wind shear scan volume of ±10° in elevation and ±25° in azimuth for the aircraft's coordinate reference. The changing beam parameters as a function of scan induce peak-of-beam gain, beamwidth/gain slope, and rise of side lobe levels adjacent to the main beam.

Radiation parameters are further degraded due to real world peak and root mean square amplitude and phase errors due to electrical, thermal and mechanical tolerances of the passive and active X Band subassemblies within the AESA assembly.

New GCS algorithms are desirable to mitigated the weaknesses and exploit the strengths of AESA technology

SUMMARY

In one aspect, embodiments of the inventive concepts disclosed herein are directed to a radar system and method including an AESA that illuminates a target with a first pulse for a desired beam pointing angle (azimuth and elevation). The AESA then illuminates the target with a second pulse for the desired pointing angle, the second pulse defining a radiation pattern with a main beam in phase with the first pulse, but side lobes that are out of phase. The radar system receives return signals and combines the return signals to null the side lobes by the principle of superposition. The radar processing unit is time synced such that the pulse-pair is interpreted as a single ultra-low level side lobe return radiation pattern.

In a further aspect, the first pulse and second pulse may illuminate the target at the same time where two AESA antennas are configured simultaneously. Alternatively, the first pulse and second pulse may be separated in time by some know delay so that the first pulse is received and processing delayed by the processor.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
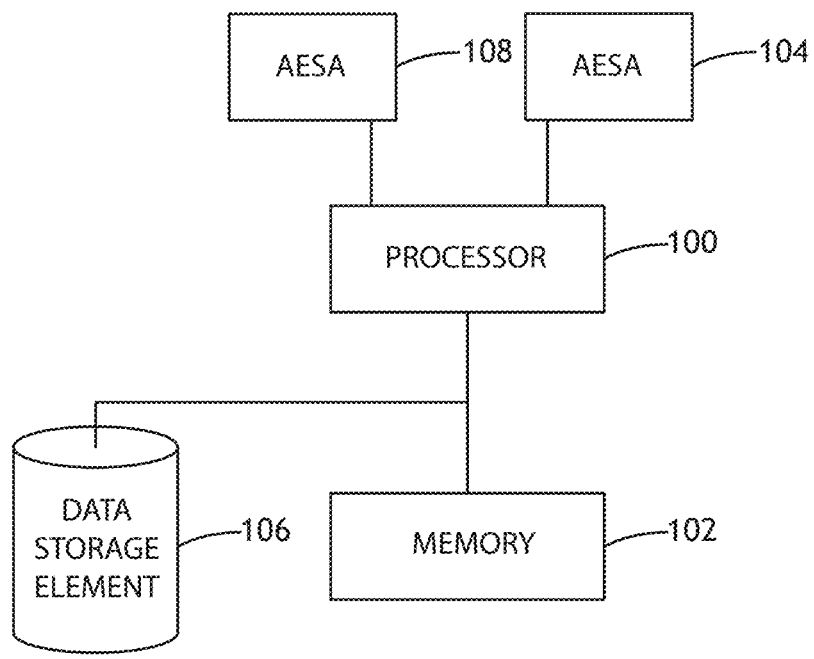
FIG. 1 shows a block diagram of a system suitable for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar system and method including an AESA that illuminates a target with a first pulse for a desired beam pointing angle (azimuth and elevation). The AESA then illuminates the target with a second pulse for the desired pointing angle, the second pulse defining a radiation pattern with a main beam in phase with the first pulse, but side lobes that are out of phase. The radar system receives return signals and combines the return signals to null the side lobes by the principle of superposition. The radar processing unit is time synced such that the pulse-pair is interpreted as a single ultra-low level side lobe return radiation pattern.

Referring to FIG. 1, a block diagram of a system suitable for implementing an exemplary embodiment is shown. The system includes a processor 100 and memory 102 for storing processor executable code. The processor 100 electronically configures at least one radar antenna 104, 108 to produce a first radar pulse having a first main beam and side lobe configuration, and a second radar pulse having a second main beam and side lobe configuration. The main beams of the first pulse and second pulse are generally in phase and complementary while the side lobes of the first pulse and second pulse are out of phase by 180°. The processor 100 receives and combines return signals from each of the first pulse and second pulse. The side lobes being out of phase works to null the side lobes via superposition.

In at least one embodiment, the system includes two radar antennas 104, 108. The first pulse may be generated from a first antenna 104 and second pulse may be generated from a second antenna 108 simultaneously. The processor 100 receives both return pulses at the same time after simultaneous reflection from a weather event. The side lobes from each return pulse null each other. In at least one embodiment, the antennas 104, 108 comprise active electronically scanned arrays (AESAS).

In at least one embodiment, where the system includes only a single antenna 104, 108 or only utilizes a single antenna for radar imaging, the first pulse and second pulse may be generated from the antenna 104, 108 at slightly different times as defined by the time necessary to electronically reconfigure the antenna to generate the second pulse. The first return pulse may be recorded and stored in a data storage device 106 until the second return pulse is received at which point the first return pulse is combined with the second return pulse to null sidelobes.

Figure 2:
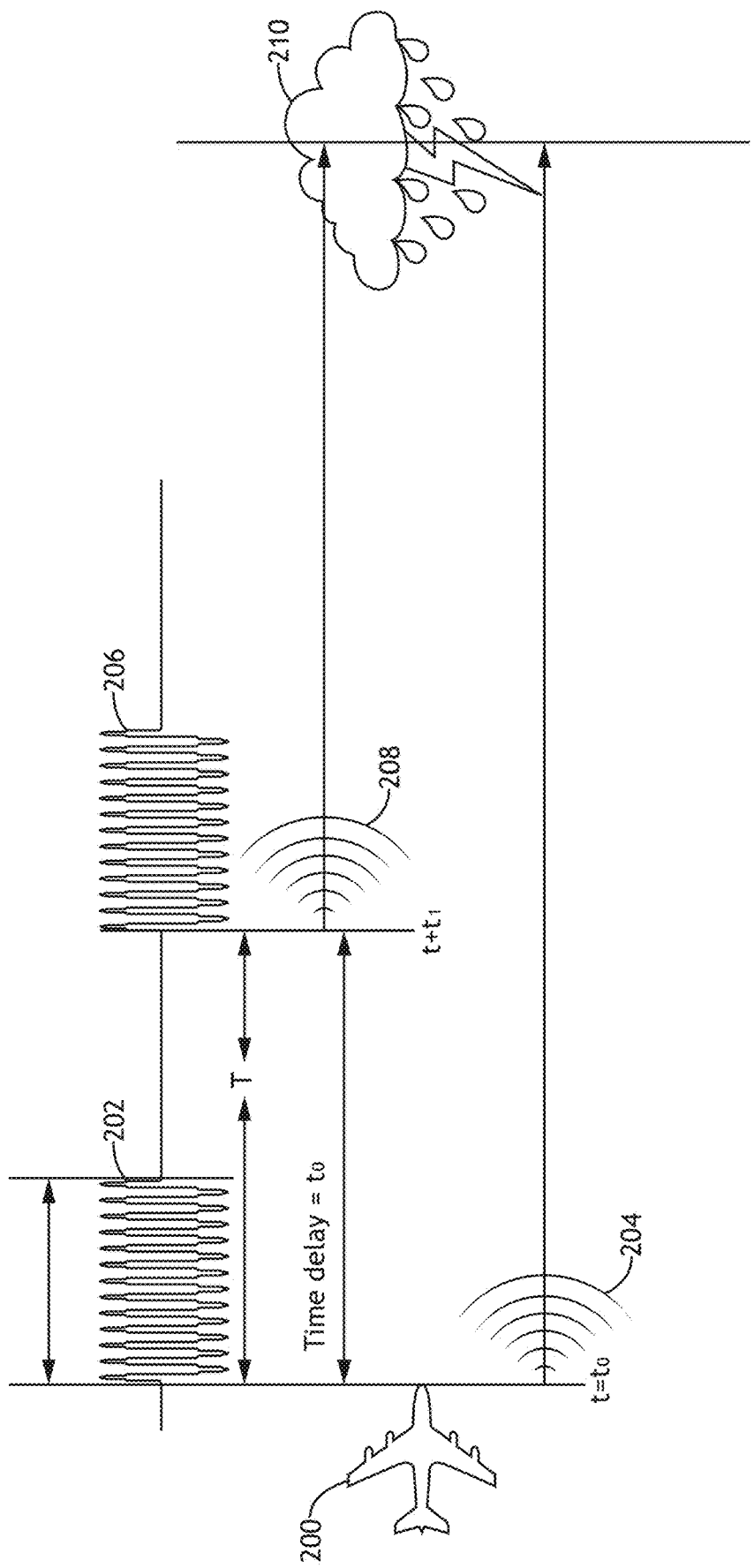
FIG. 2 shows a block environmental diagram of a radar process according to an exemplary embodiment.

Referring to FIG. 2, a block environmental diagram of a radar process according to an exemplary embodiment is shown. An aircraft 200 equipped with a weather radar generates a first pulse 204 having a waveform 202 at a time $t_0$ and a second pulse 208 having a second waveform 206 at time $t_1$. Both the first pulse 204 and second pulse 208 converge on a weather event 210, or more generally on a predetermined area which may include a weather event 210. Return signals from each of the first pulse 204 and second pulse 208 are received by the aircraft 200 and are analyzed to acquire information about the weather event 210.

In at least one embodiment, the first waveform 202 and second waveform 206 define radiation patterns with main beams in phase but side lobes out of phase such that the side lobes are nulled by superposition upon combination of the return pulses. In at least one embodiment, where the first pulse 204 and second pulse 208 are simultaneously generated via separate antennas, $t_0$ and $t_1$ may be the same or nearly the same. Alternatively, where a single antenna generates both the first pulse 204 and the second pulse 208, the radar system may track the different between $t_0$ and $t_1$, and the velocity of the aircraft, and delay processing by some computed time difference so that corresponding pulses 204, 208 are combined.

Figure 3:
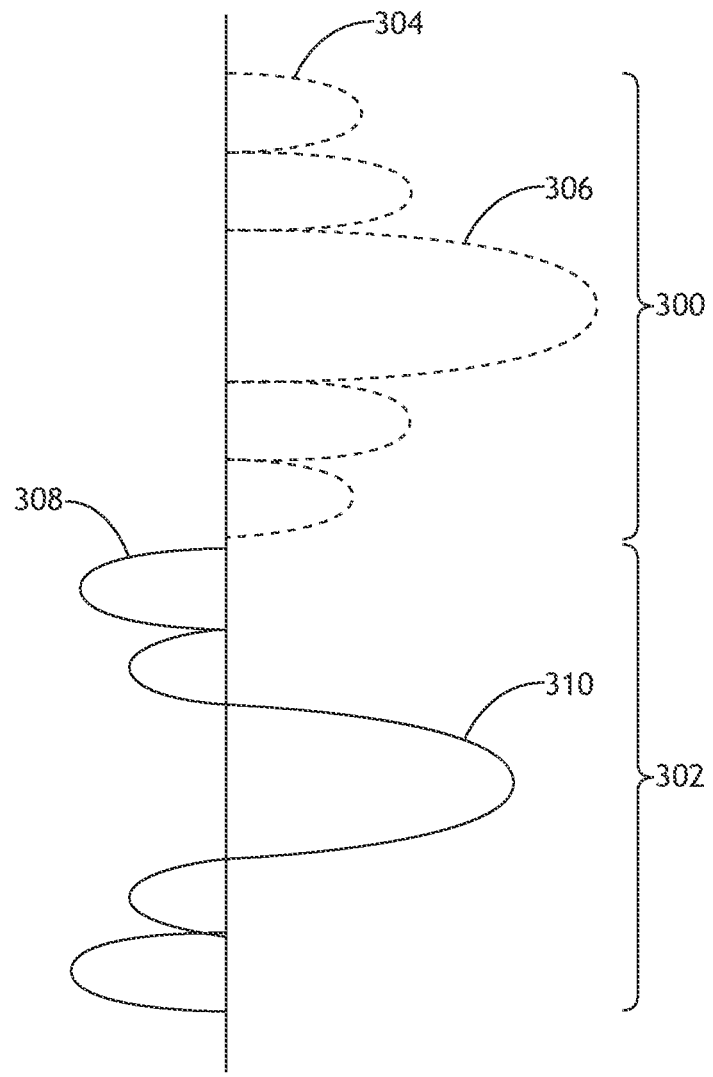
FIG. 3 shows a representation of radar signals according to an exemplary embodiment.

Referring to FIG. 3, a representation of radar signals 300, 302 according to an exemplary embodiment is shown. A first radar signal pulse 300 and second radar signal pulse 302 may be generated simultaneously or slightly separate in time with a known time gap between the first radar signal pulse 300 and the second radar signal pulse 302.

The first radar signal pulse 300 and second radar signal pulse 302 may define radiation patterns having in-phase main beams 306, 310 but side lobes 304, 308 that are 180° out of phase such that upon combination, the main beams 306, 310 constructively interfere and the side lobes 304, 308 are effectively nulled. In at least one embodiment, a return signal corresponding to the first radar signal pulse 300 may be stored for the duration of the known time gap to be combined with a corresponding return signal of the second radar signal pulse 302.

Figure 4:
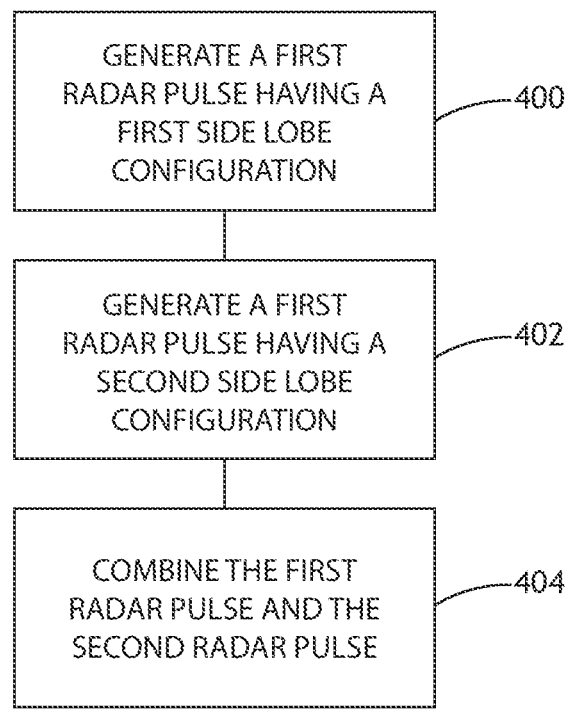
FIG. 4 shows a flowchart of a method according to an exemplary embodiment.

Referring to FIG. 4, a flowchart of a method according to an exemplary embodiment is shown. A radar system generates 400 a first radar pulse having a first radiation pattern with a main beam and interfering side lobes. The radiation pattern of the first radar pulse may be uniformly illuminated for maximum EIRP and commensurate −12.5 dBp side lobe levels for a theoretical rectangular aperture or, −17 dBp for a circular aperture.

The radar system then either subsequently or contemporaneously generates 402 a second radar pulse having a uniformly illuminating second radiation pattern with a main beam and interfering side lobes. The side lobes of the second radar pulse adiation pattern are configured via an AESA antenna to have side lobes that are out of phase with the side lobes of the first radar pulse radiation pattern such that when return signals of the first radar pulse and second radar pulse are combined 404, nulling suppresses the side lobes and limits interference. In one exemplary embodiment, the aperture synthesis of this second radar pulse is configured such that the side lobes of the second radar pulse are 180° out of phase with the first radar pulse.

It may be appreciated the aircraft's relative motion changes the path length and propagation delay of the second pulse. A delay is calculated by the processor based on aircraft motion, velocity, acceleration, etc. Aircraft motion may be compensated by changing the antenna phase center, shifting the effective phase center of the antenna backward to compensate for forward motion of the aircraft, resulting in and effectively stationary antenna over the next dwell and a narrow clutter spectrum. Alternatively, the aircraft may change the transmitter frequency to match ground speed.

In one exemplary embodiment, where pulses are configured with a pulse repetition frequency of 333.33 kHz, each pulse may have an interval of approximately 3μ seconds. A time delay in processing may defined by $d\phi/dt$, where $\phi$ is phase. Time delay may be approximated by mod 360 of phase for a narrow band system, across information bandwidth.

In at least one embodiment, pulses hit the target at the same instant with side lobes 180° out of phase. Side lobes are thereby nulled via superposition.

Embodiments of the present disclosure enable AESA-based radar processing techniques that mitigate the weaknesses of an AESA and maximizes its strengths; remove changing beam parameters as a function of scan for an AESA that is incompatible with current GSC techniques; and exploit AESA fast beam steering and precision aperture phase and amplitude setting to realize the two radiation patterns required for phase conjugation. The net result of the pulse pair conjugation is that maximum transmit EIRP is maintained while synthesizing ultra-low transmit side lobe levels, which has previously not been possible. Embodiments enable compensation of side lobe levels over a two-dimensional AESA scan volume.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one processor in data communication with a memory storing processor executable code for configuring the at least one processor to:
   configure a radar system to:
      generate a first radar pulse at a time $t_0$, having a first radiation pattern with defining a main beam and a plurality of side lobes;
      illuminate a target with the first radar pulse;
      generate a second radar pulse at a time $t_1$, after the time $t_0$, having a second radiation pattern with defining a main beam and a plurality of side lobes;
      illuminate a target with the second radar pulse;
      receive a first return signal corresponding to the first radar pulse; and
      receive a second return signal corresponding to the second radar pulse;
   store the first return signal for a duration of $t_1-t_0$;
   record a change in relative position of the radar system during the duration $t_1-t_0$;
   calculate a further duration correction based on a propagation delay difference between the first radar pulse and the second radar pulse; and
   combine the first return signal and the second return signal,
   wherein the side lobes of the second return signal are out of phase with the side lobes of the first return signal.

2. The computer apparatus of claim 1,
   wherein:
      the first radar pulse is generated by a first active electronically scanned array (AESA) antenna in the radar system; and
      the second radar pulse is generated by a second AESA antenna in the radar system.

3. The computer apparatus of claim 1, wherein the side lobes of the second return signal are out of phase by 180°.

4. The computer apparatus of claim 1, wherein the first radar pulse and second radar pulse each comprise a Barker sequence.

5. A method comprising:
   generating a first radar pulse at a time $t_0$, having a first radiation pattern defining a main beam and a plurality of side lobes;
   illuminating a target with the first radar pulse;
   generating a second radar pulse at a time $t_1$, after the time $t_0$, having a second radiation pattern defining a main beam and a plurality of side lobes;
   illuminating a target with the second radar pulse;
   receiving a first return signal corresponding to the first radar pulse;
   receiving a second return signal corresponding to the second radar pulse;
   storing the first return signal for a duration of $t_1-t_0$;
   recording a change in relative position of the radar system during the duration $t_1-t_0$;
   calculating a further duration correction based on a propagation delay difference between the first radar pulse and the second radar pulse; and
   combining the first return signal and the second return signal,
   wherein the side lobes of the second return signal are out of phase with the side lobes of the first return signal.

6. The method of claim 5, wherein:
   the first radar pulse is generated by a first active electronically scanned array (AESA) antenna; and
   the second radar pulse is generated by a second AESA antenna.

7. The method of claim 5, wherein the side lobes of the second return signal are out of phase by 180°.

8. The method of claim 5, wherein the first radar pulse and second radar pulse each comprise a Barker sequence.

9. A radar system comprising:
   at least one active electronically scanned array (AESA) antenna;
   at least one processor in data communication with each of the at least one AESA antennas and a memory storing processor executable code for configuring the at least one processor to apply signals to the at least one AESA antenna via intervening circuitry to:
      generate a first radar pulse at a time $t_0$, having a first radiation pattern defining a main beam and a plurality of side lobes;
      illuminate a target with the first radar pulse;
      generate a second radar pulse at a time $t_1$, after the time $t_0$, having a second radiation pattern defining a main beam and a plurality of side lobes;
      illuminate a target with the second radar pulse;
      receive a first return signal corresponding to the first radar pulse; and
      receive a second return signal corresponding to the second radar pulse; and
   the at least one processor is configured to:
      store the first return signal for a duration of $t_1-t_0$;

record a change in relative position of the radar system during the duration $t_1-t_0$;

calculate a further duration correction based on a propagation delay difference between the first radar pulse and the second radar pulse; and combine the first return signal and the second return signal, wherein the side lobes of the second return signal are out of phase with the side lobes of the first return signal.

10. The radar system of claim 9, wherein:

the at least one AESA antenna comprises two AESA antennas, the first radar pulse is generated by a first AESA antenna; and the second radar pulse is generated by a second AESA antenna.

11. The radar system of claim 9, wherein the side lobes of the second return signal are out of phase by 180°.

12. The radar system of claim 9, wherein the first radar pulse and second radar pulse each comprise a Barker sequence.

\* \* \* \* \*